United States Patent [19]

Meyer

[11] Patent Number: 5,298,852
[45] Date of Patent: Mar. 29, 1994

[54] ARRANGEMENT FOR AND METHOD OF CONTROLLING A THREE-PHASE-GENERATOR IN A VEHICLE

[75] Inventor: Friedhelm Meyer, Illingen, Fed. Rep. of Germany

[73] Assignee: Robert Bosch GmbH, Stuttgart, Fed. Rep. of Germany

[21] Appl. No.: 941,967

[22] Filed: Sep. 8, 1992

Related U.S. Application Data

[63] Continuation of Ser. No. 548,921, Jul. 27, 1990.

[30] Foreign Application Priority Data

Dec. 22, 1988 [DE] Fed. Rep. of Germany ........ 3843163

[51] Int. Cl.$^5$ ............................ H02J 7/14; H02P 9/30
[52] U.S. Cl. .......................................... 322/29; 322/34
[58] Field of Search ............................ 322/29, 33, 34

[56] References Cited

U.S. PATENT DOCUMENTS

| | | | |
|---|---|---|---|
| 4,398,140 | 8/1983 | Morishita | 322/34 X |
| 4,450,389 | 5/1984 | Frister et al. | 322/29 X |
| 4,470,003 | 9/1984 | Mitchell | 322/33 X |
| 4,636,706 | 1/1987 | Bowman et al. | 322/29 X |
| 4,890,050 | 12/1989 | Mackevich | 322/34 |

Primary Examiner—R. J. Hickey
Attorney, Agent, or Firm—Michael J. Striker

[57] ABSTRACT

The method of regulating a motor vehicle three-phase generator for operation in an overexcited range includes determining a temperature of the generator by a temperature-determining device provided in a voltage regulator circuit for the generator, supporting the housing of the voltage regulator on one of the generator component parts, reducing an excitation current of an excitation coil of the generator to keep the temperature of the generator below a predetermined maximum temperature when a generator speed is between a first generator speed threshold and a second generator speed threshold and increasing the excitation current of the excitation coil of the generator above the nominal value of the excitation current without consideration of the determined temperature, when the generator speed exceeds the second predetermined generator speed threshold and is below the first predetermined generator speed threshold.

1 Claim, 2 Drawing Sheets

ARRANGEMENT FOR AND METHOD OF CONTROLLING A THREE-PHASE-GENERATOR IN A VEHICLE

This is a continuation of application Ser. No. 548,921 filed Jul. 27, 1991.

BACKGROUND OF THE INVENTION

The invention relates to an arrangement for and a method of controlling a three-phase generator in a vehicle.

At present, three-phase generators are preferably used for supplying energy in the motor vehicle. These generators generate an alternating voltage or alternating current which is rectified in a rectifier arrangement connected to the generator, and is used for supplying the consumers and for charging the battery. Since the output voltage of the three-phase generator depends considerably on the generator speed, a voltage regulator must be used for achieving the desired constant output voltage.

In independently or separately excited generators, the voltage regulator influences the generator exciting current in such a way that the generator output voltage maintains a constant value, e.g. 14 volts, in spite of considerably changing generator speed between idle and full load and in spite of considerable load fluctuations of the generator.

However, problems result in the power supply in the motor vehicle in winter or in city traffic, since the internal resistance of the battery increases considerably in cold weather, so that its cold start performance is considerably reduced. Moreover, power supply problems and battery charging problems occur at low speeds. Therefore, it is attempted to control the current delivery from the three-phase generators in such a way that the three-phase generators can be utilized to an increased degree. For this purpose, it is suggested, e.g. in Swedish Patent Application 77.02656 corresponding to U.S. Pat. No. 4,237,412 to determine the battery temperature with a temperature sensor and feed this to the voltage regulator. At low battery temperatures, the voltage regulator then increases the output voltage of the generator on the basis of the measurement signal of the temperature sensor and lowers the output voltage of the generator at high temperatures.

A voltage regulator for a generator which charges a battery in a motor vehicle is also disclosed in DE-OS 34 23 767. The temperature of this battery is measured with a temperature sensor, and in so doing, a voltage proportional to the battery temperature is fed to the regulator. In addition, means for determining the internal temperature are provided in the voltage regulator itself and are used for regulating the generator output voltage when the battery temperature sensor has a defect. Taking into account the battery temperature and regulator temperature itself when regulating the voltage enables improvement of the charging balance by increasing the generator output voltage, particularly at low temperatures.

In spite of the known measures, sufficient power supply in the motor vehicle is still a problem, chiefly due to a continuously increasing number of consuming devices as automobile development continues.

SUMMARY OF THE INVENTION

The object of the invention is a three-phase generator in a vehicle which enables an optimal power output while taking into account the sharply fluctuating generator speed and which is nevertheless protected against thermal overloading.

This object, and others which will be made more apparent herein after is attained in a method of operating a three-phase generator of a motor vehicle, this three-phase generator having a plurality of generator component parts including an excitation coil through which an excitation current flows during generator operation, a nominal value of the excitation current being provided for normal operation of the generator and the generator being operable in the overexcited range by providing another value of the excitation current greater than the nominal value, and a voltage regulator controlling an output voltage of the generator and having a circuit arrangement including temperature-determining means for determining a generator temperature and a housing.

According to the invention the method of operating the three-phase generator comprises the steps of:

a. determining a temperature of the generator by the temperature-determining means provided in the circuit arrangement of the voltage regulator;

b. supporting the housing of the voltage regulator on one of the plurality of generator component parts;

c. reducing the excitation current of the excitation coil of the generator to keep the temperature of the generator determined in the determining step a) below a predetermined maximum temperature when a generator speed is between a first generator speed threshold and a second generator speed threshold; and d. increasing the excitation current of the excitation coil of the generator above the nominal value of the excitation current, when the generator speed exceeds the second predetermined generator speed threshold and is below the first predetermined generator speed threshold.

The method, according to the invention, for regulating the voltage of a three-phase generator in a vehicle has the advantage compared with the known methods that the generator can be operated in an overexcited range when large output power is necessary, so that it delivers the maximum possible output while simultaneously preventing the generator from being destroyed due to thermal overheating. Since the temperature measurement is effected in the voltage regulator itself and since the voltage regulator is fastened to the connecting plate of the rectifier, it is ensured that the temperature relevant for thermal loading is measured by means of direct coupling.

As a result of the advantageous temperature measurement, the generator can be operated in the overexcited range until the temperature reaches a critical value. It is ensured by subsequent reduction of the exciting current that the temperature of the generator or regulator decreases again.

It is particularly advantageous to construct the temperature measurement circuit within the internal circuit of the regulator.

The present invention both as to its construction so to its method of operation, together with additional objects and advantages thereof, will be best understood from the following detailed description of the specific embodiment when read in connection with the accompanying drawing figures.

DETAILED DESCRIPTION OF THE PREFERRED EMBODIMENT

Figure 1:
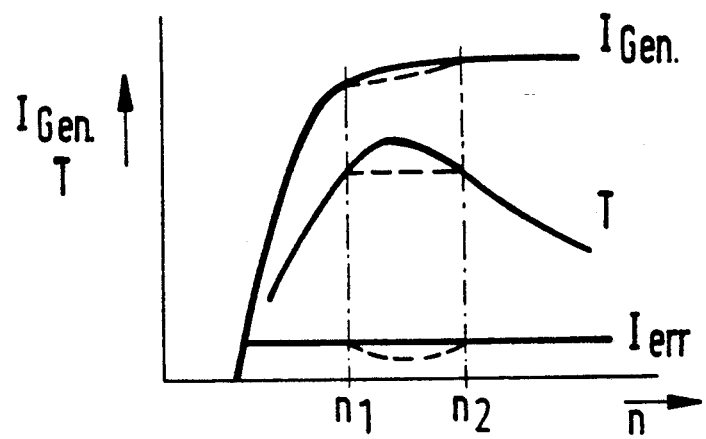
FIG. 1 is a graphical illustration of the dependence of the generator output current, the diode temperature and the exciting current on the generator speed for a constant output voltage of the generator.

FIG. 1 is a graphical illustration of the dependence of the generator output current $I_{Gen}$ and diode temperature T on the generator speed for a constant output voltage of the generator. The solid lines are for constant exciting current $I_{err}$. In a speed range between n1 and n2, the temperature takes on prohibited high values when the exciting current $I_{err}$ is higher than the nominal exciting current of the generator or when, e.g.; a high ambient temperature prevails. It is therefore suggested, according to the invention, to reduce the exciting current in this speed range until the temperature assumes values corresponding to the curve shown in the dashed line in FIG. 1. The respective exciting current in the area between n1 and n2 is likewise shown in a dashed line. Because of the reduction of the exciting current in the speed range between n1 and n2, the generator current in this area also increases somewhat more slowly, e.g. it will assume the curve drawn in dashes in FIG. 1. The speed range n1 n n2 in which the diode temperature can reach excessively high values, can not be easily determined in advance, since it depends upon external influences, e.g. the ambient temperature; a maximum diode temperature is therefore determined which does not yet lead to thermal overloading of the generator. The measurement of this temperature is described in the following.

A positive heat sink 10 carries respective positive diodes of the rectifier bridge with connections B+, W and DF, the rectifier bridge is not shown. The positive heat sink 10 is coupled via the connection plate 11 with the negative heat sink 12 containing the negative diodes. The housing 14 of the voltage regulator 13 is fastened on a generator component, i.e. in the present embodiment on, the embodiment example, the negative heat sink 12 of the rectifier, not shown. A direct coupling of the negative heat sink 12 with the housing 14 of the voltage regulator 13 is accordingly achieved. The circuit located in the regulator housing 14 contains a temperature measurement circuit 15, not shown in detail on which measures the housing temperature and, with the provided good thermal coupling, accordingly also measures the temperature of the negative heat sink 12 in a virtually error-free manner.

The brush holder 16 is fastened to the connection plate 11; however, it can also be fastened at another location, e.g. at the negative heat sink 12.

Figure 3:
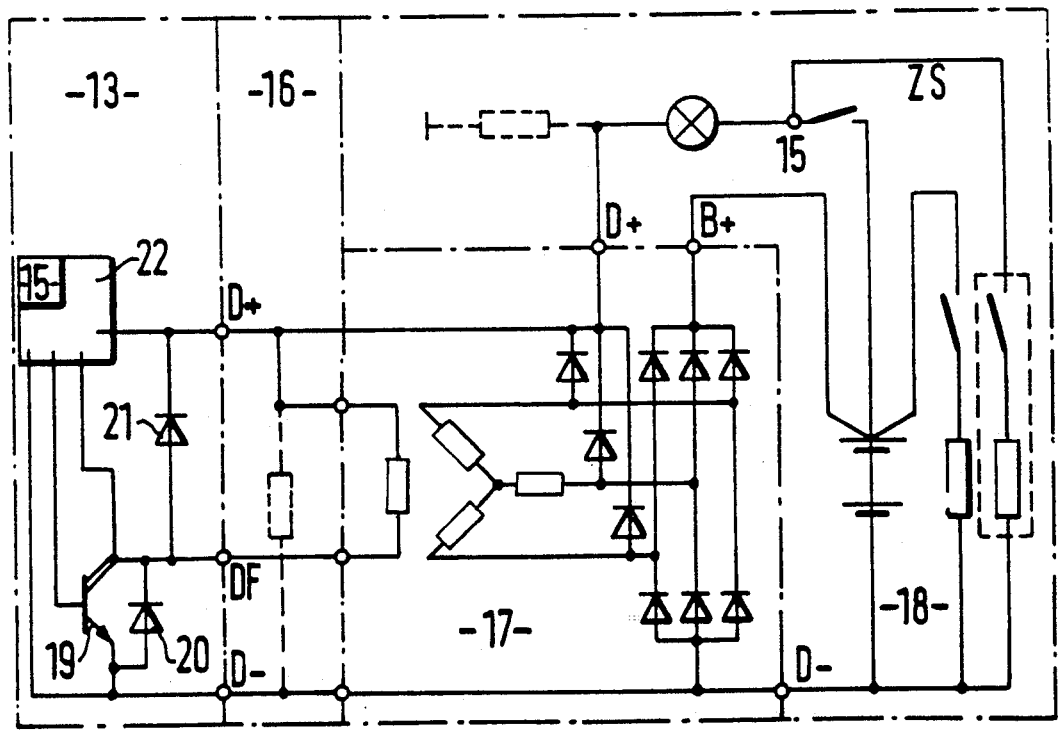
FIG. 3 shows a schematic block diagram of an electric circuit; the circuit connections, known per se, between regulator, battery and three-phase generator with its essential components, follow from this diagram.
Figure 2A:
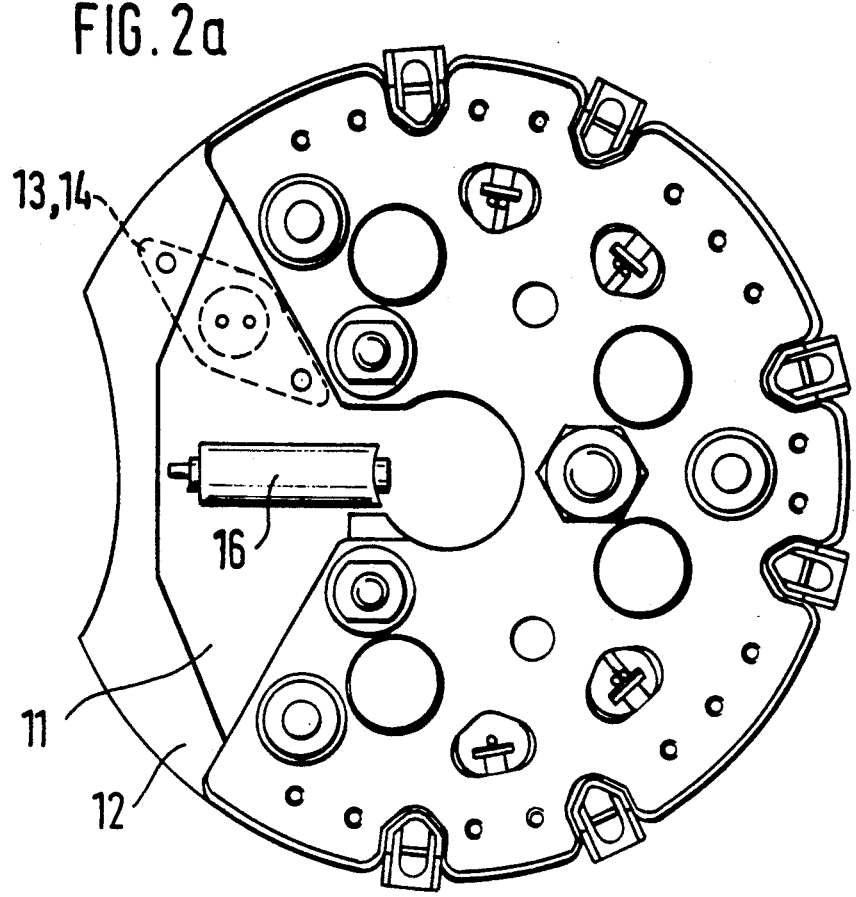
FIG. 2a shows a top view of the arrangement according to the invention.
Figure 2B:
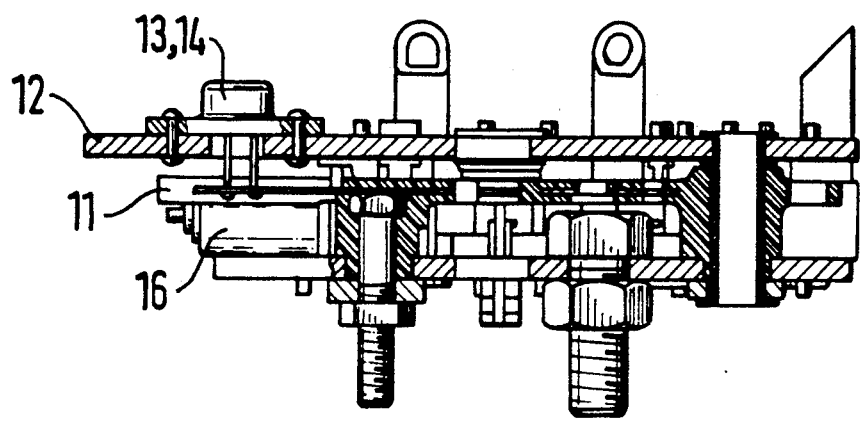
FIG. 2b shows a side cross-sectional view of the arrangement according to the invention.

The circuit diagram of a three-phase generator 17 which provides energy to a power supply system 18 is shown schematically in FIG. 3. The generator output voltage is regulated by a voltage regulator 13 which is connected via the brush holder 16 with the three-phase generator 17. The generator 17 with terminals D+, B+, DF and D−, the power supply system 18, and the brush holder 16 are constructed in the usual manner and are not described in more detail here.

The voltage regulator 13 with output terminals D+, DF and D− contains a generally conventional switching element, e.g. a switching transistor 19 with a parallel connected diode 20 which is connected between the regulator terminals DF and D−, as well as a recovery diode 21 which lies between DF and B+. In addition, the voltage regulator 13 contains a circuit arrangement 22, not shown in more detail, which is connected between the terminals D+, DF and D− and with the base of the transistor 19 as well as with its collector.

This circuit arrangement 22 contains the temperature measurement circuit 15 which measures the temperature of the housing of the voltage regulator 13. This circuit arrangement 22 can have additional added functions, e.g. an error indication possibility, device for evaluating the motor functions; a temperature gauge can also be provided at the battery, its output signal being fed to the circuit arrangement, 22.

The voltage regulator 13 with the circuit 22 containing the temperature measurement circuit 15 can also be a component of a generator with controlled rectifiers, e.g. thyristors. It can be constructed e.g. in monolithic construction.

In a generator with permanent excitation, such a voltage regulator with an internal temperature measuring element can also be fastened directly on the generator. In such a generator, the generator output current is directly reduced when the temperature detected by the temperature measurement circuit contained in the voltage regulator exceeds a value which can be predetermined.

While the invention has been illustrated and described as embodied in an arrangement for and method of controlling a three-phase-generator in a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A method of regulating a motor vehicle three-phase generator, said three-phase generator having an output voltage and a plurality of generator component parts including an excitation coil through which an excitation current flows during generator operation, said excitation current having a nominal value and said generator being operable in an overexcited range by providing said excitation coil with another value of said excitation current greater than said nominal value, and voltage regulator means connected to said generator to control said output voltage of said generator and being provided with temperature-determining means for determining a generator temperature and with a housing, said method comprising the steps of:

a. determining said generator temperature by said temperature-determining means provided in said voltage regulator means;
b. supporting said housing of said voltage regulator means on one of said generator component parts;
c. reducing said excitation current of said excitation coil of said generator to keep said generator temperature determined in the determining step a) below a predetermined maximum temperature when a generator speed of said generator is between a first generator speed threshold and a second generator speed threshold; and
d. increasing said excitation current of said excitation coil of said generator above said nominal value, when said generator speed exceeds said second predetermined generator speed threshold and is below said first predetermined generator speed threshold.

* * * * *